Feb. 14, 1928.
G. S. CORNISH
1,659,084
RADIO TRAP
Filed Feb. 4, 1925
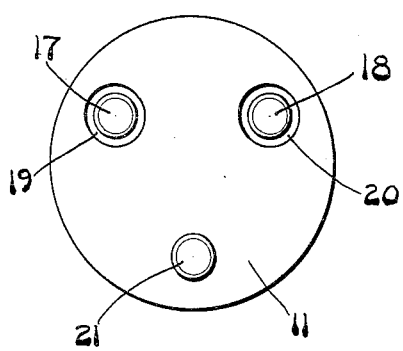
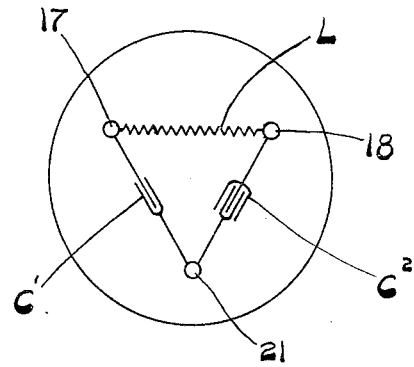
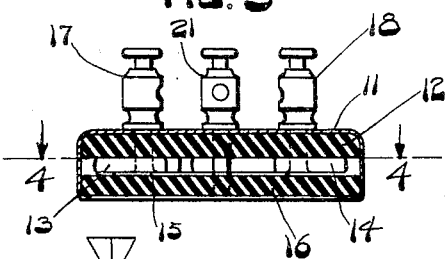
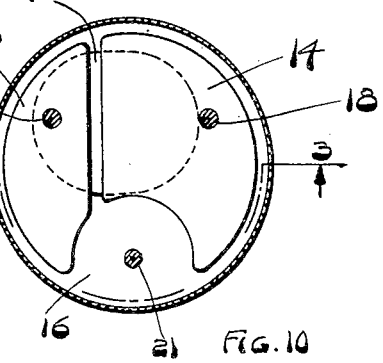
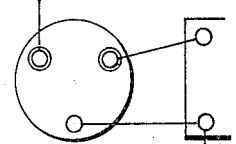
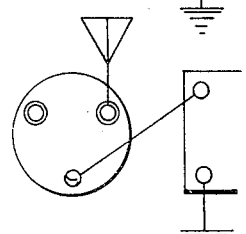
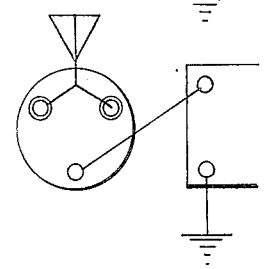
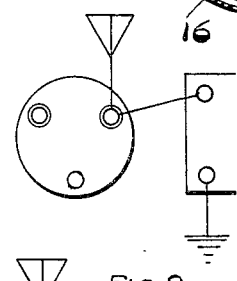
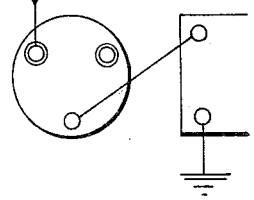
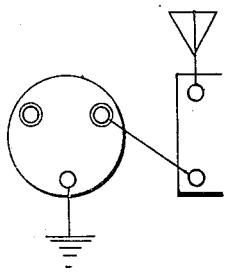
INVENTOR
Guy S. Cornish
BY Thornton Bogert
ATTORNEY Patented Feb. 14, 1928.

1,659,084

UNITED STATES PATENT OFFICE.

GUY S. CORNISH, OF CINCINNATI, OHIO, ASSIGNOR TO THE CINCINNATI PATENT ENGINEERING COMPANY, OF CINCINNATI, OHIO, A CORPORATION OF OHIO.

RADIOTRAP.

Application filed February 4, 1925. Serial No. 6,710.

This invention relates to a simple but effective means of accomplishing many things in connection with the functioning and manipulation of a circuit for radio receivers.

An object of my invention is to produce a device for accomplishing by the simplest of connections with an existing circuit, such results as the shortening of an antenna, the lengthening of an antenna, the subduing of undesirable signals and the elimination of considerable noise during the operation of of a receiver.

These and other objects are attained in the device described in the following specification. This device, which I have chosen to term a radio trap, is illustrated in the accompanying drawing, in which:

Fig. 1 is a plan view of the trap embodying my invention.

Fig. 2 is a diagrammatic view of the trap to be herein described, in which the usual symbolic representation of parts is employed in order to convey the proper understanding of the construction and functioning of the trap.

Fig. 3 is a somewhat transverse sectional view of the trap in order to disclose to better advantage its interior construction, taken on the line 3—3 of Fig. 4.

Fig. 4 is a sectional plan view taken on the line 4—4 of Fig. 3.

Figs. 5 to 10 inclusive are diagrammatic views upon a reduced scale, showing several ways in which my improved trap may be connected with the usual radio receiver.

The construction of my improved trap consists of a casing or shell 11 which is preferably of the form shown, within which a disc of dielectric material 12 is placed next to the closed top of the casing. Against this disc a pair of metal plates 13 and 14 are placed to form a substantially crescent shape as shown, the plate 13 being considerably smaller than the plate 14. These plates are separated as shown in Fig. 4, but against them and extending across the space between them is a sheet of paper or similar material which has preferably been coated or saturated with india ink or like material designed to form in effect a leak across the two plates. Against these plates a disc of dielectric 16 is placed and the lower edge of the casing is turned over to retain the assembled plates in the positions described.

In order to afford connection with the plates 13 and 14 as well as leak 15 I have provided binding posts 17 and 18 which extend above the casing 11 as shown, but which do not contact therewith, the casing having been cut out around these binding posts to avoid contact, as shown at 19 and 20 in Fig. 1. However, an additional binding post 21 has been provided, which merely is mounted on the discs 12 and 16 and extends through casing 11, having connection with the casing or not, as preferred. In no manner do elements 13, 14 and 15 connect with post 21.

The relative values and functioning of the elements I have just described are shown in the diagrammatic view Fig. 2. The effect of the element 15 is that of a leak as represented by the symbolic representation designated by letter L. The condenser effect which exists between small plate 13 and post 21 is represented by the small symbolic condenser $C'$, while the condenser effect which exists between large plate 14 and post 21 is represented by the large symbolic condenser $C^2$.

Connections, such as shown somewhat diagrammatically in Figs. 5 to 10 inclusive, involve the following general principles of functioning of the trap construction and it is upon these principles that the connections shown have been worked out, such other connections as are also possible, but which have not been shown herein, being worked out with the following general principles in mind.

When the condenser is placed in series with the antenna the effect is to shorten the antenna. When the condenser is placed in parallel with the antenna the effect is to lengthen the antenna. Small condenser capacity is secured when only posts 17 and 21 are connected in the circuit. Larger condenser capacity is obtained when only posts 18 and 21 are connected in the circuit. Full condenser capacity is obtained when posts 17 and 18 are connected together and then introduced into the circuit with post 21. When the posts 17 and 18 are connected in series in the circuit undesirable signals are subdued. When posts 17 and 18 are connected in parallel in the circuit undesirable noises are to a great extent eliminated.

Thus experimentation with various capacity values and resistance in the antenna and ground leads of the circuit is possible, but as antennæ, sets and locations differ it is possible to give but a few of the rules and examples of connections possible with my improved device.

Having thus described my invention what I claim is:

A radio trap comprising a metal shell, a metal plate within the shell, a second metal plate within the shell adjacent to but separated from the first metal plate, a current leakage means connected with and adapted to afford current leakage between the plates, a dielectric between the shell and plates, and terminals affording independent connection to said shell and to each of said plates, whereby any desired combination of connections may be made with said shell, plates and leakage means.

In testimony whereof I have hereunto affixed my signature.

GUY S. CORNISH.